INVENTORS
PAUL H. KEMMER
EDGAR R. WEAVER

Aug. 28, 1945.   P. H. KEMMER ET AL   2,383,491
METHOD AND APPARATUS FOR TESTING AIRCRAFT STRUCTURES
Filed Sept. 11, 1939   7 Sheets-Sheet 3

INVENTORS
PAUL H. KEMMER
EDGAR R. WEAVER
BY
ATTORNEYS

INVENTORS
PAUL H. KEMMER
EDGAR R. WEAVER
BY
ATTORNEYS

INVENTORS
PAUL H. KEMMER
EDGAR R. WEAVER

Aug. 28, 1945.   P. H. KEMMER ET AL   2,383,491
METHOD AND APPARATUS FOR TESTING AIRCRAFT STRUCTURES
Filed Sept. 11, 1939   7 Sheets-Sheet 7

INVENTORS
PAUL H. KEMMER
EDGAR R. WEAVER

Patented Aug. 28, 1945

2,383,491

UNITED STATES PATENT OFFICE 2,383,491

METHOD AND APPARATUS FOR TESTING AIRCRAFT STRUCTURES

Paul H. Kemmer, Fairfield, and Edgar R. Weaver, Dayton, Ohio

Application September 11, 1939, Serial No. 294,344

21 Claims. (Cl. 73—88)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an improved method and apparatus for static testing aircraft structures.

It is customary to subject airplane structures and various parts thereof to a static test to check resistance to bending and shear under basic or other loads.

In the past, test loads have been applied to airplane structures and the various parts thereof by means of bags of sand or shot. This method is time-consuming, laborious, and expensive, because many thousands of pounds of calibrated weights must be handled and placed. Furthermore, this method does not represent a true application of the loads, and consequently the pressures, to which the plane and the various parts thereof, particularly the wings, are subjected during actual flight conditions. The reason for this is as follows: It is well established that the forces on an airplane wing comprise a "positive pressure" sustaining force on the underside of the wing and a lifting force on the upper side of the wing, created by the flow of air past the wing. The flow of air past the wing results in a sub-atmospheric pressure adjacent the upper surface of the wing, commonly called "negative pressure." The forces vary with the angle of attack, tests having shown that for typical wings at a zero degree angle of attack, 100% of the total upward force on a wing is derived from the upper surface; at a 5-degree angle of attack, 74% is due to the force on the upper surface; and at a 10-degree angle of attack, 68%.

There is also a variation of lift across the wing span because of the complex motion of the air in flowing around the wing. On the underside of the wing, near the tip, air is flowing out and upward, while nearer the center of the span, the outward component is not so pronounced. Similarly, the upper side of the wing is subjected to an inward component which is greatest at the tip. Thus, it is apparent that the pressure on the upper and lower wing surfaces are variable for different conditions of flight.

Prior to this invention, static testing of an airplane wing was accomplished by suitably anchoring and supporting it at one end after the manner of a cantilever beam, loading the upper side with bags of sand or shot and measuring the deflections for different increments of load. It is readily appreciated that the stresses and strains developed in the wing and transmitted to the fuselage of the plane are different, when tested in this manner, from those developed under actual flight conditions.

It is an object of this invention to provide static test apparatus for loading an airplane, and particularly the wings thereof, in the same manner as the airplane is loaded during various flight conditions, also to so locate and apportion the loads as to more perfectly simulate flight conditions than has been possible with known methods of loading during testing.

It is another object of this invention to provide, as a part of the testing apparatus, a lifting patch adapted to be temporarily cemented to a surface subjected to "negative pressure" and which it is desired to subject to a tension force by a pull or lift.

It is a further object of this invention to provide a lifting patch which will develop a lifting force or negative pressure sufficiently large for the purpose intended and which can be applied over plate joints, rivets, curved surfaces and the like. It is of primary importance that the patch be capable of transmitting a pulling force of large magnitude while offering a negligible resistance to buckling of the tested member in the event of sufficient flexure to cause buckling.

It is still another object of this invention to provide static test apparatus which so nearly simulates loadings under actual flight conditions that the yield point and ultimate strength of the structure can be predicted from the stress strain and deflection data obtained by the test. In proof testing it is thus possible to test the plane itself rather than a test model, without injury to the plane.

It is a further object of this invention to produce an airplane and parts thereof which will comply with different design flight characteristics by subjecting the airplane to forces corresponding in magnitude, direction, and application to the forces exerted upon the airplane for the design flight characteristics, determining from the deflection, distortion, buckling, wrinkling, and failure of members, the lack of compliance with the design flight characteristics and modifying the structure accordingly.

It is also an object of this invention to sustain an airplane in a simulated flight condition and while in said sustained condition to subject it or a selected part thereof to a vibration test.

In carrying out the invention, the forces and pressures applied to each part or surface of the structure correspond in magnitude and direction to the forces and pressures to which the part or surface will be subjected during flight. For instance, a force equal to the engine load is applied to the plane at the center of gravity of the engine load. Similarly applied are gas tank, landing gear, pilot, and other loads.

The airplane may be tested under a condition of basic or special loads. The basic loads on an airplane are the loads applicable when the airplane is at rest or in a condition of unaccelerated flight. It is readily understood that when static testing under conditions other than that of basic load, it is necessary to additionally load or suitably anchor the airplane to provide a reaction load appropriately located and opposed in direction to the force constituting the special load condition. The special load condition may result from any one of the following conditions: The load applied during some special maneuver, the maximum probable load on the airplane or part, the design load or the ultimate load.

Figure 1:
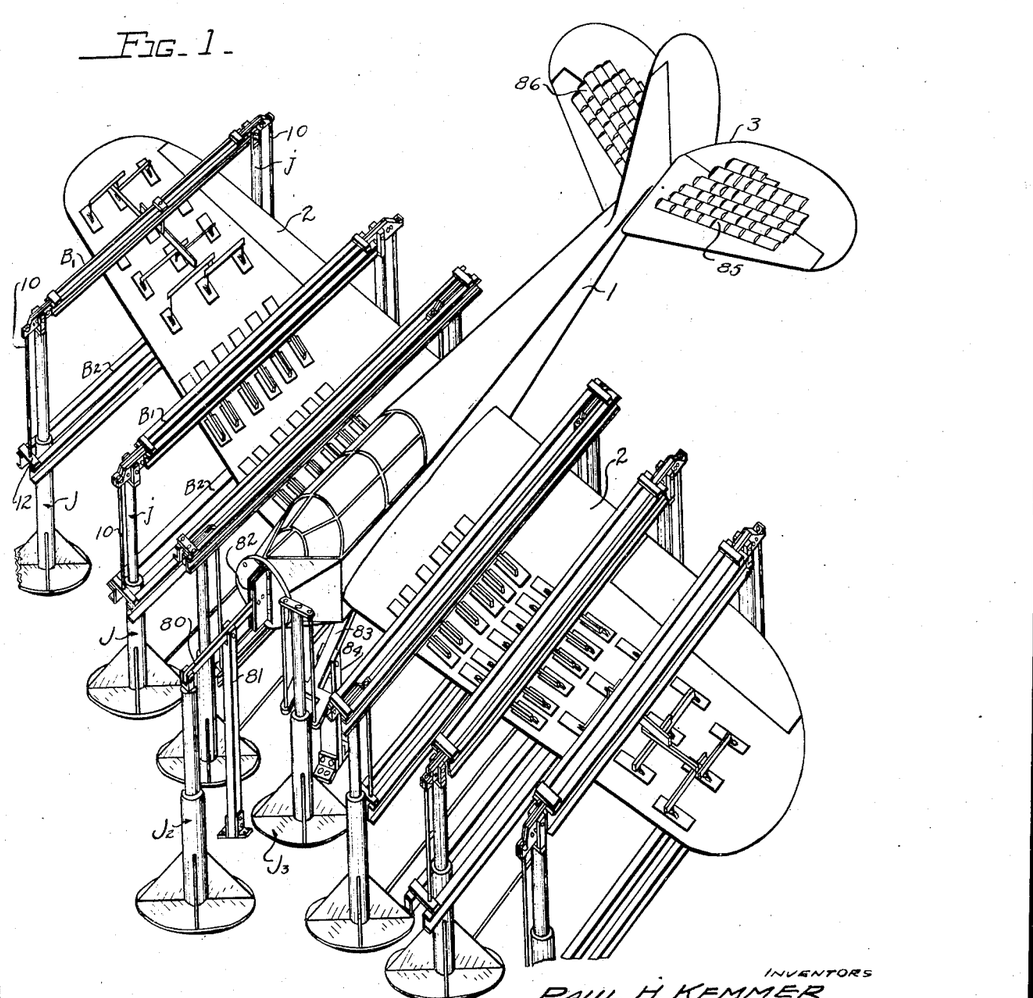
Fig. 1 is a perspective view of a test set-up showing apparatus for testing an airplane in accordance with the teachings of this invention.

Referring to the drawings, and particularly to Fig. 1, the airplane being tested in accordance with the invention comprises the fuselage 1, wings 2, and tail portion 3. Connected together and to a pair of jacks J are an upper and a lower beam member $B_1$ and $B_2$, respectively.

Figure 5:
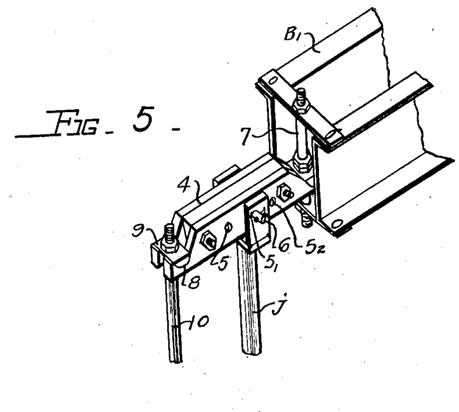
Fig. 5 is a detail view of the connection of the lower beam member to the upper beam member showing the adjustability of the members to vary the ratio of the forces exerted by the upper and lower beams.
Figures 6, 7, 8, 9, 10:
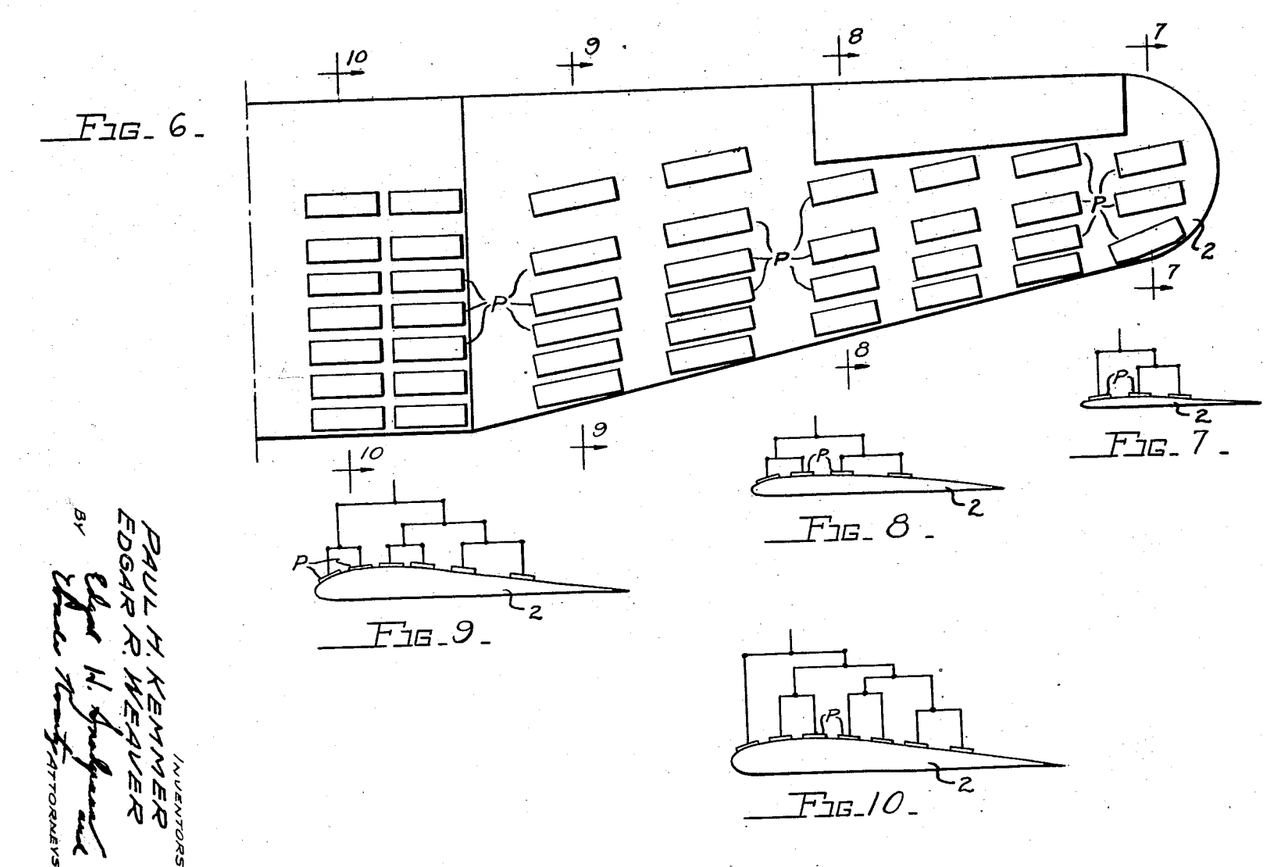
Fig. 6 is a plan view of an airplane wing showing an arrangement of lift-producing members.
Fig. 7 is a cross-sectional view taken along the lines 7—7 of Fig. 6, showing the force-apportioning lever system.
Fig. 8 is a cross-sectional view taken along the lines 8—8 of Fig. 6.
Fig. 9 is a cross-sectional view taken along the lines 9—9 of Fig. 6.
Fig. 10 is a cross-sectional view taken along the lines 10—10 of Fig. 6.

Referring to Fig. 5, the beam members are adjustably connected to the forked upper portion $j$ of jacks J by levers 4. Each lever 4 has a plurality of holes 5, $5_1$, and $5_2$ therein for adjustably receiving the connecting pin 6. One end of lever 4 is suitably fastened by means of bolt 7 to the upper beam member $B_1$. The other end of the lever 4 is formed with a semi-circular cut-out portion 8 for pivotally receiving a correspondingly-shaped bearing member 9. The upper end of connecting rod 10 is rigidly fastened to member 9. The lower end of rod 10 is connected to lower beam member $B_2$ by means of pin 11 as shown in Fig. 2 or, as shown in Fig. 1, by suitably fastening rod 10 to cross bar 12, rigidly connected to lower beam member $B_2$.

Figure 2:
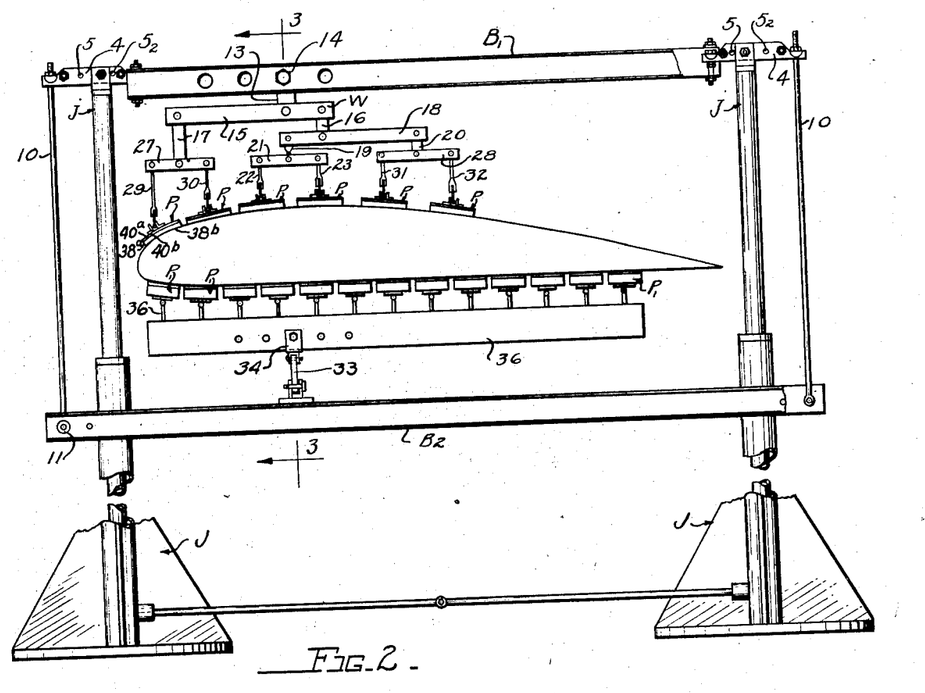
Fig. 2 is a cross-sectional view of an airfoil section being tested by having a tension force applied to the upper surface and a partial sustaining force to the lower surface of the section.

Referring to Fig. 2, an airplane wing is shown being tested by subjecting it to a lifting or tension force on the upper side and a compressive or sustaining force on the lower side. A lifting force is applied to the upper surface by means of lifting patches P, cemented to the upper surface of the wing and connected to the upper beam member by means of a whiffletree or lever system referred to generally as W. Patches P are suitably located on the upper surface of the wing to apply loads to the surface at locations and in amounts to simulate as nearly as possible an actual loading condition. By varying the pivotal connections of the various levers constituting the lever system, patches may be added to or taken away from the lifting force producing system. The total force to be exerted by each patch is predetermined, and the patch is so located as to apply to the area under its influence a force proportional or equal to the force to which that area is subjected under the actual flight condition assumed for test.

Figure 3:
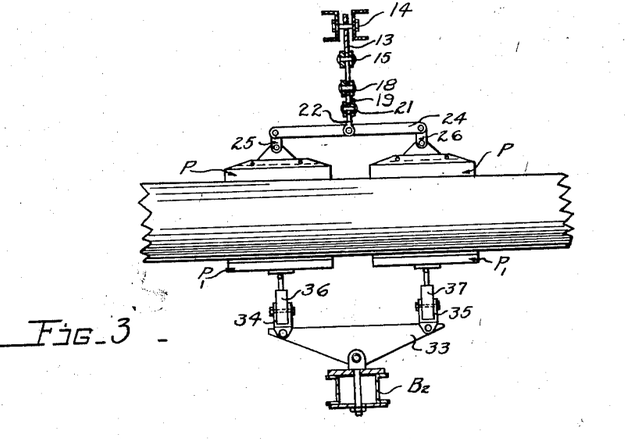
Fig. 3 is a cross-sectional view along the lines 3—3 of Fig. 2.

Referring to the arrangement of levers in Figs. 2 and 3, link 13 is pivotally connected by means of bolt 14 to upper beam member $B_1$. Lever 15 is pivotally connected to link 13 at a location such that the major portion of the lifting force is transmitted to link 16 and the minor portion, to link 17. The lifting force transmitted to link 16 is divided by means of lever 18 to links 19 and 20. Lever 21 divides the force from link 19 to links 22 and 23, each of which carries two patches by means of a cross lever 24 (Fig. 3) and patch-carrying links 25 and 26. Links 23, 29, 30, 31, and 32 are similar to link 22 in that they each carry a lever corresponding to lever 24 to which are attached a pair of patch-carrying links corresponding to links 25 and 26. All the levers are provided with a plurality of pin-receiving openings for adjustably connecting the links thereto, permitting a wide selection of lever ratios and a ready adjustment of the lever system. It is readily understood that the amount of force transmitted to each patch can be mathematically calculated, and by selectively connecting the links and levers a predetermined force can be applied to each patch.

By way of example, there is shown in Figs. 6 through 10 an arrangement of patches, together with the links and levers for transmitting the lifting force from the upper beam member to the various patches. These lever arrangements will not be described in detail, it being understood that, similarly to Fig. 2, the levers are so selected and connected as to apportion a predetermined lifting force to the area governed by each patch. It is also to be understood that the lever arrangements are connected to an upper beam member and that compression patches, connected to a lower beam member, are also provided.

Referring again to Figs. 2 and 3, a compressive or sustaining force is transmitted from the lower beam member $B_2$ to the under surface of the wing through lever 33, connectors 34 and 35, levers 36 and 37, and thence to compression patches $P_1$. The link and lever connections of the compression patches to the lower beam member are all pin-connected and, as in the upper force-transmitting system, a plurality of pin-connecting openings are provided for making the system adjustable.

Figure 11:
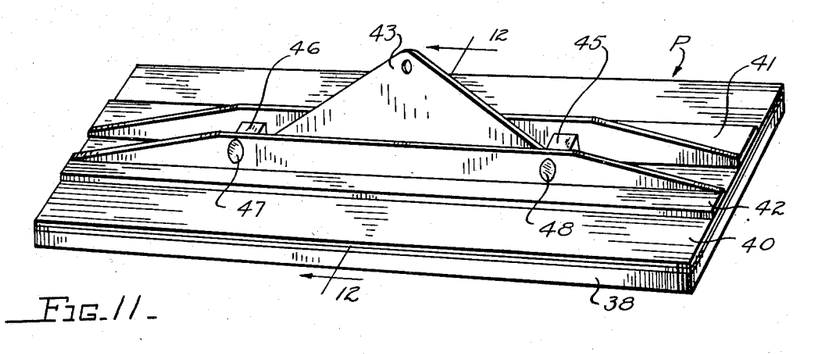
Fig. 11 is a perspective view of a lifting patch.
Figure 12:
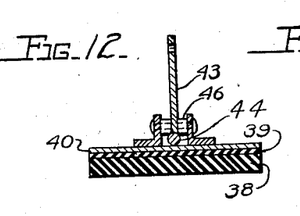
Fig. 12 is a cross section taken along the lines 12—12 of Fig. 11.
Figure 12A:
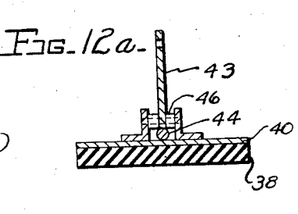
Fig. 12a is a view similar to Fig. 12, showing a modified form of lifting patch.
Figure 13:
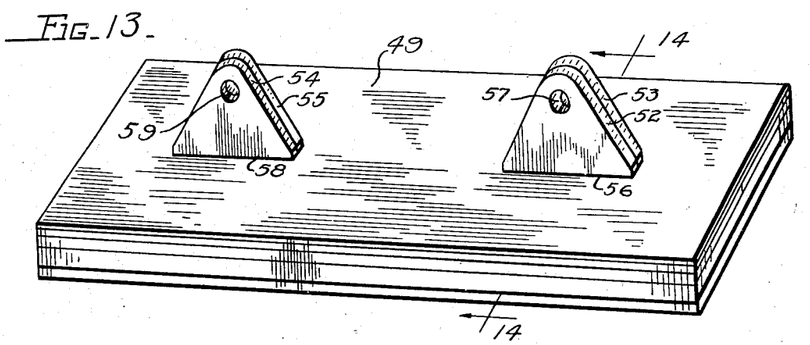
Fig. 13 is a perspective view of another type of lifting patch.
Figure 14:
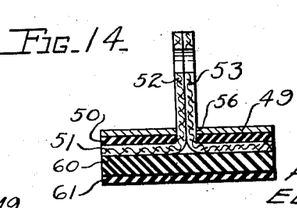
Fig. 14 is a cross section taken along the lines 14—14 of Fig. 13.

The lifting patch, heretofore referred to generally as P, is illustrated in detail in a preferred embodiment in Figs. 11, 12, and 12a and in a second embodiment in Figs. 13 and 14.

The patch in Figs. 11 and 12 comprises a portion 38 of sponge rubber or other suitable deformable material of a desired thickness and adapted to be cemented to a surface to be subjected to a negative pressure or lifting force. The sponge rubber portion 38 may be cemented or otherwise bonded directly to the plate 40, as shown in Fig. 12a, but it is preferred to bond an intermediate sheet 39 of tough rubber or rubberized fabric to the sponge rubber and the plate to better tranmit the stress from the surface to which the sponge rubber is attached to the plate. Tough rubber, in one of its most common forms, is raw or unvulcanized. It is naturally of a higher density than sponge rubber. A pair of angle irons 41 and 42 are suitably connected to plate 40 by riveting, electric welding, or the like. A connecting plate 43 has two ends rounded as at 44 to extend under blocks 45 and 46 fastened to the angle irons by bolts 47 and 48. In the preferred embodiment, the patch is approximately six inches by twenty-four inches and is designed to exert a lifting force of one thousand pounds, although in actual tests a lifting force considerably in excess of this has been developed.

Figure 12B:
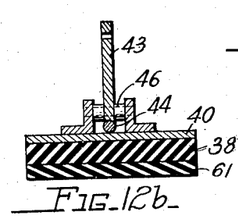
Fig. 12b is a view similar to Fig. 12a of a modified form of the patch.

As shown in Fig. 12b, a sheet of tough rubber 61 is cemented to the sponge rubber to better transmit the stress from the sponge rubber to the surface to which the lifting force is to be applied.

Figure 14A:
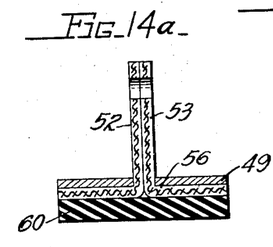
Fig. 14a is a view similar to Fig. 14 of a modified form of the patch.

The patch shown in Figs. 13 and 14 comprises a plate 49, a sheet of tough rubber 50 cemented or otherwise suitably fastened thereto, a rubberized fabric member 51, having integral therewith tabs 52 and 53 adjacent one end and tabs 54 and 55 adjacent the other end. The pair of tabs 52 and 53 extend through an opening 56 in the steel plate 49 and have an opening 57 for receiving a link-connecting pin. Tabs 54 and 55 extend through an opening 58 in the plate and are provided with an opening 59 for receiving a link-connecting pin. Cemented to rubberized fabric member 51 is a sponge rubber sheet 60 to which is cemented a sheet of tough rubber 61. Sheet rubber layer 61 is provided to better transmit the stress from the sponge rubber element 60 to the surface to which a lifting force is to be applied. Likewise, strip 50 is provided to insure a better distribution of the lifting force to the plate by providing an intermediate bonding member which transmits the force to the plate without destroying the bond. It is obvious that, under some conditions of operation of the device, members 50 and 61 could be omitted as shown in Fig. 14a. It is also to be understood that members 49, 50, 51, 60, and 61 may be bonded together by any suitable means.

As illustrated in Fig. 2, the patch P which is connected to link 29, comprises a stiff plate 40a having a concave face 40b conforming approximately to the curvature of the adjacent portion of the skin of the aircraft to be tested. A body of resilient rubber material 38a adheres to the concave face 40b of the plate 40a, and it has an opposite face 38b, which is adapted to adhere throughout its face to the adjacent skin of the aircraft. The resilient body 38a is of substantially uniform thickness and yieldability throughout the area of the face thereof.

Figures 15, 16:
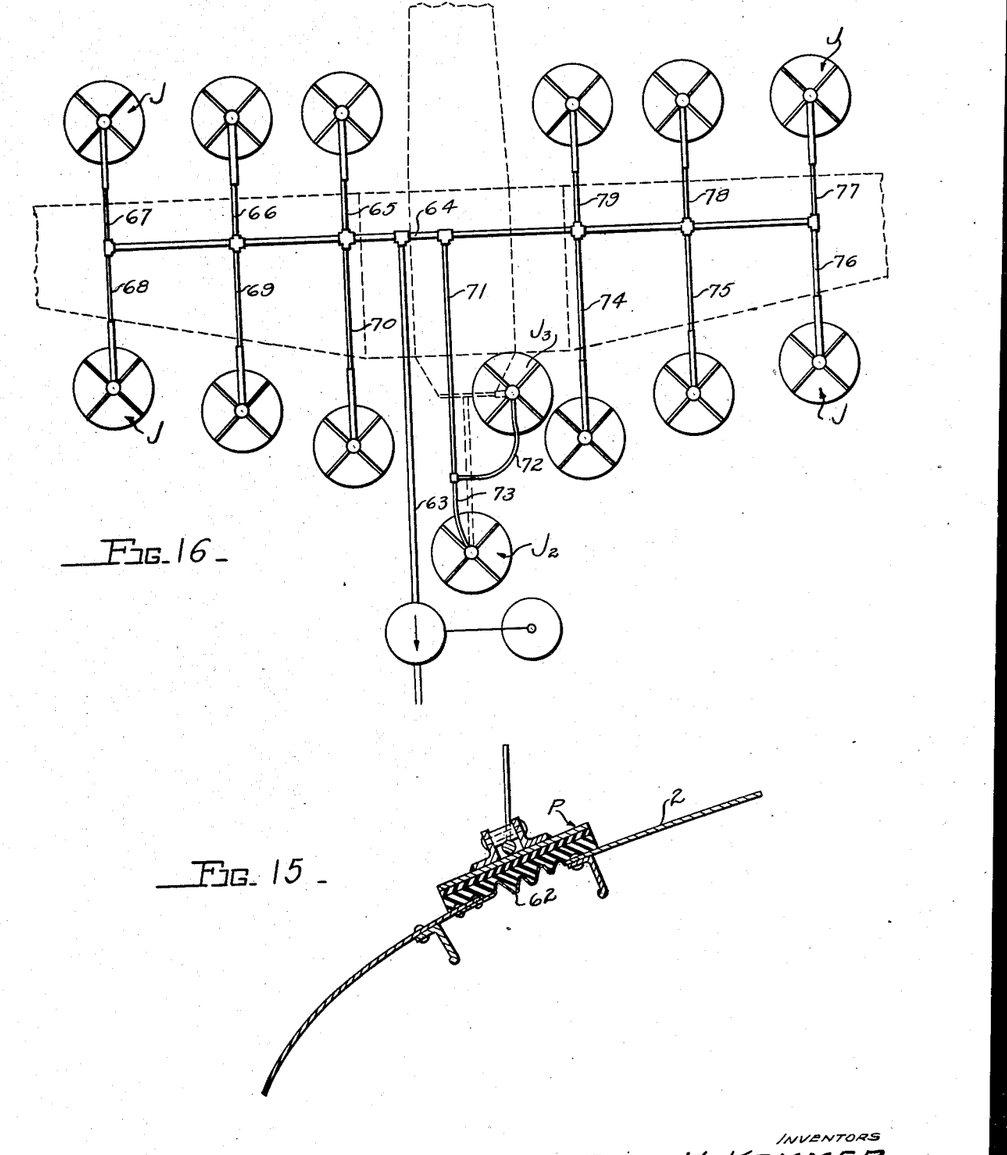
Fig. 15 is a cross-sectional view showing how the patch permits buckling of the surface of the airfoil.
Fig. 16 is a plan view showing a conduit arrangement for conducting actuating fluid from a common source of power to the force-producing members.

Referring to Fig. 15, a lifting patch P is shown cemented to wing 2 which has wrinkled or buckled under applied stress. The buckling is shown slightly exaggerated at 62. This illustrates how the patches permit the surfaces to deform under stress. In order to permit the aircraft skin to deform in waves during the application of the test loads due to shear stress similar to the wrinkling or buckling of the skin on, for example, a wing due to flight loads, it is essential that the deformable resilient material of the patch be sufficiently thick that the face of the patch cemented to the aircraft skin can deform without interference by the backing plate of the patch. Tests conducted with various patch constructions have indicated that so long as the layer of resilient material has a total thickness of at least one-half inch, the backing plate will be ineffective to locally reinforce the aircraft skin and the skin and the face of the patch adhered thereto will be free to buckle or wave as a result of shear stress in the skin.

Figures 17, 18, 19, 20:
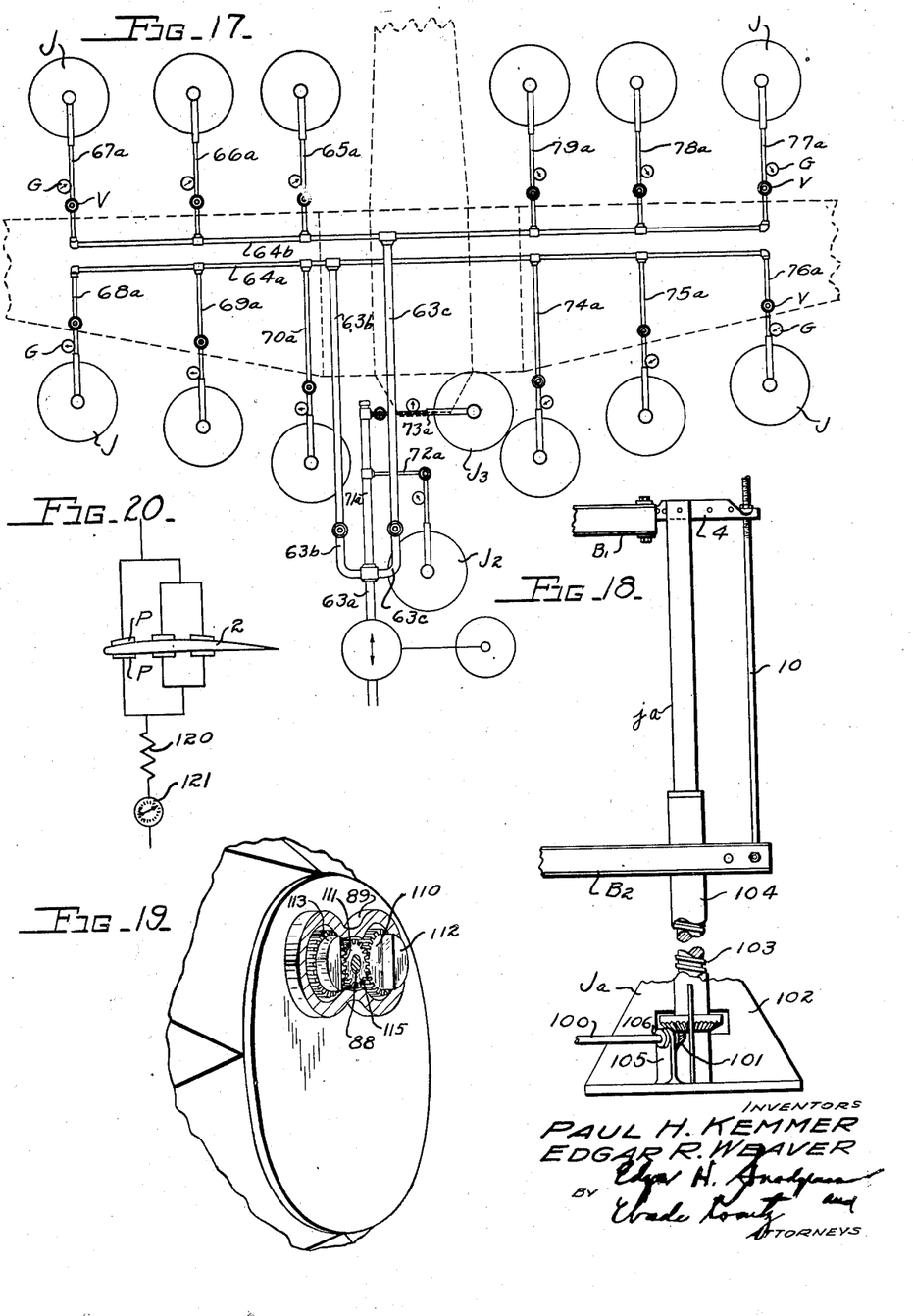
Fig. 17 is a plan view similar to Fig. 16 showing pressure-controlling and -indicating means incorporated in the system.
Fig. 18 is an elevational view of an alternative type of jack.
Fig. 19 is an isometric view of the vibration-producing apparatus.
Fig. 20 is a diagrammatic view of an arrangement of tension patch as applied to the upper and lower surfaces of a wing to be tested.

Referring to Fig. 16, the jacks are interconnected for pneumatic operation by a system of conduits 63 through 79 to a common source of pressure. In the preferred embodiment of the invention, no pressure regulating means are provided in any of the conduits, it being the intention to vary the lifting force on the surfaces by changing the lengths of the levers or their points of pivotal connection. However, it is to be understood that pressure-regulating valves may be incorporated in portions of the line if desired. As shown in Figure 17, means are provided in the conduits for controlling the pressure to the various jacks and, consequently, the force exerted by the various jacks. In this figure of drawing, line 63a, connected to a source of energy (not shown) is divided into lines 71a, 63b and 63c. Line 71a conveys pressure to jack $J_2$ through line 72a, and jack $J_3$ through line 73a. Line 63b connects with line 64a, which in turn is connected to lines 68a, 69a, 70a, 74a, 75a, and 76a. Line 63c connects with line 64b, which in turn is connected with lines 65a, 66a, 67a, 77a, 78a, and 79a. Pressure-regulating valves V and pressure indicating gauges G both of conventional construction, are provided at desired locations. It is also to be understood that the jacks may be operated by other means, for instance, such as screws, hydraulic means, or otherwise. As shown in Figure 18, jacks of the type illustrated by $J_a$ may replace the jacks illustrated in Figure 16. Jack $J_a$ is of the screw type in which sliding element $J_a$ is threaded at its lower end at 103. Ring 102, rotatably mounted on cylindrical housing 104 of jack $J_a$ is internally threaded (not shown) to operatively engage threaded portion 103. Ring 102 is externally threaded for engagement with pinion 101 integral with operating shaft 100. Shaft 100 is rotatably mounted in bracket 105 and is provided with a thrust collar 106 integral with the shaft for preventing relative longitudinal movement between the shaft and the bracket. The arrangement of the invention illustrated in Figure 16 may be used in connection with hydraulic means as well as pneumatic.

Loads are applied to the plane to represent each and every load on the plane under the conditions assumed for test. These loads may be all applied by means of the patches, levers, and beams; but it is sometimes found to be more convenient to apply the loads to certain areas by means of weights, such as metal bars or bags of sand or shot. The tail load is applied to the plane in Fig. 1 by means of bags of shot 85 and 86. The pilot and other loads may be similarly applied. Referring again to Fig. 1, jack $J_2$ applies to the fuselage through lever 80, post 81, and connection 82, a load representing the engine load. A load representing the gas tank load is applied through jack $J_3$, lever 83, and a post 84. Also, as previously explained, when testing under conditions other than that of basic load, a load is applied to the fuselage of the plane generally by means of weights to provide a downward reaction force representing the load factor under which the plane is to be tested. For instance, if the plane is to be tested under a special loading condition, a reaction load is applied to the fuselage, of such a magnitude as to permit forces to be applied to the wings and other parts of the plane to stress it in the same manner as the plane would be stressed under the special loading condition. The reaction load is varied to conform to the applied load under the conditions for which the plane is being tested.

Figure 4:
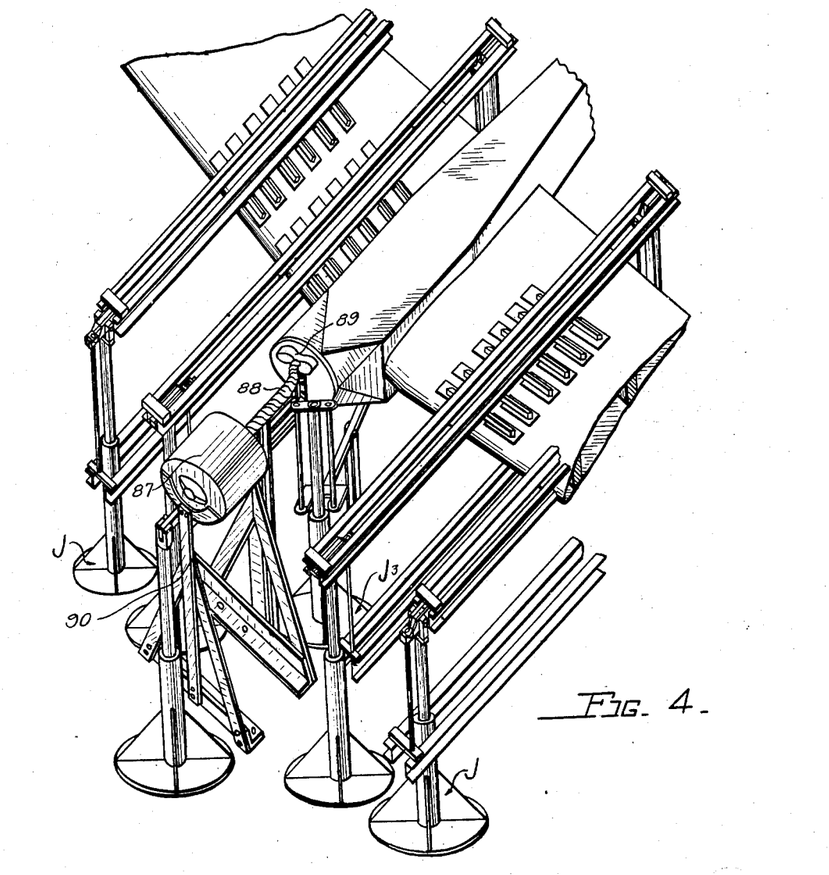
Fig. 4 is a perspective view similar to Fig. 1, but showing vibration-producing apparatus associated with the plane.

Referring to Fig. 4, the plane is set up for a vibration test. Pressures are suitably applied to the plane by lifting and compression patches and weights to stress the plane in the same manner as it would be under the flight condition assumed. With the plane in the suspended condition, a vibration effect, representing a condition to which the plane might be subjected, is applied at a selected point on the plane. The vibration effect is produced by motor 87, flexible shaft 68 and vibration-producing mechanism 89, suitably attached to the fuselage. The vibration mechanism is old and well known per se and as shown in Figure 19 broadly comprises two oppositely rotating disks 110 and 111 geared to be driven by the motor and flexible shaft and eccentrically weighted at 112 and 113 to produce vibratory forces. The periphery of the disks are provided with teeth adapted to mesh with the teeth on pinion gear 115 attached to flexible shaft 88 to rotate therewith. The vibration-producing apparatus is suitably bolted to the fuselage of the plane at the point desired to be tested. By means of this arrangement, the action of a plane may be observed and valuable information obtained with respect to the strength and behavior of selected parts of the plane when subjected to vibration forces. Motor 87 is suitably supported by a trestlework 90.

The airplane may be tested by means of this apparatus under one or more of several loading conditions. For instance, standard conditions are: high incidence, low incidence, maximum stabilizer and elevator load, maximum fin and rudder load, level landing, three-point landing and nosing over. Special loading conditions include that of inverted flight. The usual tests are under the conditions of high incidence, low incidence, and inverted flight. Also, vibration tests may now be performed following the teachings of the invention.

The operation of the device is as follows:

The jacks are appropriately placed and upper and lower beam members connected thereto by means of rod 10 and lever 4 adjusted to desirably proportion the load between the upper and lower beams. Patches, operatively engaging the surfaces to be stressed, are connected by links and levers to the beam members in such a manner as to transmit the desired amount of force to each patch. Jack $J_2$ is appropriately connected to exert on the plane a load representing the engine load. Jack $J_3$ is appropriately connected to the fuselage to exert thereon a load representing the gas tank load of the plane. The reaction load is opposed to the lifting load on the plane and may be applied to the fuselage by jacks and patches or by weights. Pilot, tail surface, and other loads are also applied to the plane, either by means of the jacks and patches or by weights. The reaction load is selected according to the test to which the plane is to be put. For instance, if it is to be tested at 20% of the design load, an appropriate reaction load, totaling with other non-lifting forces to 20% of the design load, must be applied to the fuselage so that it will be possible to apply the desired lifting force to the wings. Fluid under pressure is now supplied to the jacks from a common source of power through the interconnected conduits. The forces are applied gradually to the various parts of the plane. Spring dynamometers 121, as illustrated in Figure 20, may be connected wherever desired in the lever system or to the force-transmitting members to indicate the applied force at that particular location. However, this is not necessary, since the lifting force to be exerted by each patch has been previously calculated, and from a reading of the pressure gage in the conduit line the amount of force exerted by each patch can be determined. The deflections of various parts of the plane are measured by observing through a Y level suitable markings on the plane or reference means attached to the plane.

From observation of wings on airplanes which have been subjected to diving conditions, resulting in partial failure, there are indications that both sides of the wings have been subjected to extreme conditions of negative pressure during the dive. In order to simulate such a condition for static test purposes, it is only necessary to change the system of levers so that tension patches and pulling forces can be applied to both sides of the wings. As shown in Figure 20, the airplane wing 2 has attached to the upper and lower surfaces thereof, tension patches P suitably connected to a system of beams and levers. The upper system of beams and levers is connected to an upper beam member similar to $B_1$, illustrated in Figure 2, while the lower system may be anchored to the testing room floor. Also, a spring 120 may be provided for yieldably anchoring the lower beam system, thereby permitting a greater force to be exerted by the upper beam system than by the lower. A dynamometer 121 of conventional construction is provided in connection with the anchorage of the lower beam system, it being understood that such dynamometers may be used in the system wherever desired.

When testing for the condition of inverted flight, the airplane is inverted and compression patches are applied to the uppermost, and tension patches to the lowermost surfaces of the wings. The fuselage is suitably supported, and the beams and lever to which the patches are connected are so arranged as to produce downward forces on said wings.

It is to be clearly understood that description in the specification and drawings is by way of illustration only and is not to be taken in any way as limiting the spirit and scope of the invention. It is intended to be limited only by the terms of the appended claims.

We claim:

1. Apparatus for applying test loads to structures subjected under a condition of operation to positive and negative pressures, comprising jacks operatively connected to a common source of power, upper and lower beam members, a linkage system for connecting an upper and a lower beam member together and to said jacks, means adapted to adhere to a surface of said structure which is subjected to negative pressure and connected to one of said upper beam members to exert a tension force on said surface, and means engaging a surface of said structure subjected to positive pressure and connected to one of said lower beam members to exert a compressive force on said surface.

2. A device as recited in claim 1 in which said linkage system is adjustable to change the ratio of the forces exerted by the upper and the lower beams.

3. Apparatus for applying test loads to structures subjected to positive and negative pressures, comprising force-transmitting members operatively connected to a common source of power, upper and lower beam members, means connecting certain of said upper and lower beam members together and to certain of said force-transmitting members, lifting patches connected to each of said upper beam members and adapted to adhere to surfaces of said structure subjected to negative pressure, compression patches connected to each of said lower beam members and adapted to engage surfaces of said structure subjected to positive pressure and means connected to other force-transmitting members and engaging said structure to apply loads thereon.

4. Apparatus for applying loads to an aircraft structure, comprising operatively connected force-transmitting members, pairs of upper and lower beam members, linkages connecting the ends of each pair of upper and lower beam members to a pair of said force-transmitting members, said linkages being adjustable to change the ratio of forces transmitted from the force-transmitting members to the upper and lower beam members, lifting patches connected to each of the upper beam members and adapted to adhere to a surface of said structure in such a manner that the force exerted by each patch corresponds to the force to which the area governed by the patch is subjected during the flight condition assumed for test, elements connected to each lower beam member for exerting a compressive force on areas subjected to such a force during said flight condition, and additional force-transmitting members operatively connected with the first-named force-transmitting members and with the structure for exerting loads on the structure representing engine, gas tank, pilot, and other loads.

5. A lifting patch for transmitting forces to a structure the strength of which is to be tested, comprising a relatively rigid plate member having slots therein, a rubberized fabric element bonded to said plate member and having tabs extending through said slots and a member of deformable material bonded to said element and adapted to be adhesively connected to a surface of said structure, said member of deformable material being of such a thickness as to transmit throughout its area substantially uniform stress characteristics and to offer negligible resistance to such deformation.

6. A device as recited in claim 5 and further including a relatively thin stress-transmitting member bonded to said member of deformable material and adapted to be adhesively attached to said surface of said structure.

7. A laminated lifting patch for transmitting forces to a structure, the strength of which is to be tested and which structure is subject to surface deformation under stress, comprising a relatively rigid member, a relatively thin and dense stress-transmitting member bonded throughout a surface thereof to said rigid member and a member of deformable material bonded to said relatively thin member and adapted to be adhesively connected to a surface of said structure, said member of deformable material being of such a thickness as to transmit throughout its area substantially uniform stress characteristics and to offer negligible resistance to such deformation.

8. A device as recited in claim 7 and further including a relatively thin and dense stress-transmitting member between said member of deformable material and said surface of said structure, said thin member being bonded to said member of deformable material and adapted to be adhesively attached to said surface of said structure.

9. Apparatus for static testing a suitably enclosed airplane structure, comprising means for partially supporting the load of said structure by subjecting the upper surface thereof to an external tension force, said means including a tension patch comprising a relatively rigid member and a member of deformable material bonded to said member and adapted to be adhesively connected to a surface of said structure, said member of deformable material being of such a thickness as to transmit throughout its area substantially uniform stress characteristics and to offer negligible resistance to deformation of said surface, means applied to the under side of said structure for supporting the residual load thereof, and means for correlating the action of said two supporting means.

10. The method of testing the physical strength of an airplane wing comprising suitably anchoring the wing, applying an adhesive lifting patch to the upper surface thereof, applying a compressive patch to the lower surface thereof, subjecting the patches to predeterminately proportioned upward lifting forces to stress the wing through the medium of the patches, and measuring the deflection of the wing when stressed.

11. Apparatus for static testing an aircraft structure, comprising means for suitably anchoring the aircraft structure, means for producing a predetermined lifting force on the upper surface thereof, including a lifting patch composed of a rigid backing plate and a layer of elastic material adapted to be cementitiously attached to said upper surface, means including a patch of elastic material for applying a predetermined lifting force to the under surface of said structure, and means for producing a vibratory force on a selected part of said structure.

12. The method of testing an airplane wing for a given flight condition comprising suitably anchoring the wing, applying adhesive lifting patches to the upper and lower surfaces of the wing in predetermined positions according to the stresses desired to be transmitted thereto, subjecting the patches to predeterminately proportioned wing-stressing lifting forces, and measuring the deflection of the wing when so stressed.

13. A loading patch structure for the stress-testing of aircraft, said patch structure comprising a stiff plate having a concave face conforming approximately to the curvature of the portion of the skin of the aircraft to be tested, and a body of resilient rubber material adhered to the concave face of said plate and having an opposite face adapted to be adhered throughout said face to the skin of the aircraft, said body being of substantially uniform thickness and yieldability throughout the area of said face thereof.

14. A loading patch structure for the stress-testing of aircraft, said patch structure comprising a metal plate, a body of sponge rubber at a face of said plate, a layer of dense rubber material between said plate and said body of sponge rubber and united to said body, and a uniting material between said dense rubber layer and said plate, said uniting material comprising a suitable cement, and said structure having a face opposite said plate adapted for adhesion to the skin of the aircraft.

15. A loading patch structure for the stress-testing of aircraft, said patch structure comprising a metal plate, a body of sponge rubber at a face of the plate, a layer of dense rubber material interposed between said body and said plate and adhered to both, and a layer of dense rubber material at the opposite face of said body and adhered thereto, the last said layer of dense rubber material having a face adapted for adhesion throughout said face to the skin of the aircraft.

16. Testing apparatus for static testing a hollow aircraft structure such as a wing having a load-transmitting covering forming opposite surfaces thereof, comprising a pair of rigid load-transmitting members disposed on opposite sides of the structure to be tested, an elastic patch adhesively bonded to each covering surface throughout the entire area of the patch contiguous with the surface and each patch extending laterally from the plane of load application of said rigid members, a load-transmitting connection between each of said load-transmitting member and a respective patch, and means for simultaneously applying apportioned loads to said rigid members in the same direction.

17. Apparatus for static testing an aircraft structure by subjecting the aerodynamic lifting surfaces thereof to a distributed loading simulating on of the flight conditions of the aircraft, comprising adhesive elastic tension patch means for exerting a first lifting force distributed over a substantial part of the surface subjected to negative pressure, elastic compression pad means for exerting a second lifting force distributed over a substantial part of the surface subjected to positive pressure, and load applying means interconnecting said patch and pad means and so constructed as to maintain a predetermined ratio relationship between the first and second lifting forces.

18. An apparatus for applying test loads simulating air loads to an aircraft structure through opposed skin portions of the structure comprising a frame surrounding the structure and adapted to be elevated with a known force in planes normal to the opposed skin portions of said structure, said frame including at least two rigid backing members each respectively contiguous with one of said opposed skin portions, and elastic deformable patches of uniform thickness cemented throughout one of the faces thereof to a respective one of said opposed skin portions and the opposite faces of said patches being cemented to said backing members, said frame and patches being constructed and arranged such that elevation of said frame causes application of a distributed tension load normal to one skin portion and a distributed compression load normal to the opposed skin portion having a predetermined ratio to the magnitude of the distributed tension load.

19. A testing system for applying loads to an aircraft wing to simulate at a particular wing chord station the effects of the negative and positive air pressure loads occurring in flight on the upper and lower surfaces of the wing over an area extending spanwise on each side of the said wing chord station, comprising a pad of resilient material having a uniform thickness of the order of one-half inch or more adhesively bonded throughout its lateral area to the upper surface of the wing and extending spanwise on either side of the said wing chord station, a similar pad of resilient material secured to the under-surface of the wing and extending spanwise on either side of the said wing chord station, upper and lower rigid backing members each bonded to a respective one of said pads to distribute loads from the backing members uniformly over the area of the pads, and means for applying predetermined apportioned loads simultaneously to each of said backing members in the same direction to apply load to the upper surface through one pad simulating the effect of negative air-pressure load thereon and to apply load to the lower surface through the other pad simulating the effect of positive air pressure load thereon.

20. A testing system for applying test loads to an aircraft wing structure or the like when arranged in a normal flight attitude comprising upper and lower beam members disposed respectively above and below the wing at a selected wing chord station and parallel to the wing chord, a pair of fluid pressure jacks, each jack having a link adjustably fulcrumed on the load supporting member of the jack intermediate the ends of the link, tension rods connecting one end of each link to the upper beam member, tension rods connecting the other ends of the links to the lower beam member, simultaneous actuation of said jacks causing a predetermined apportionment of the total load between said upper and lower beam members, separate load-dividing linkage systems respectively operatively connected with said upper and lower beam members, a plurality of elastic tension patches adhesively bonded to the upper surface of the wing and extending spanwise of the plane of said wing chord station, a plurality of elastic compression patches secured to the under-surface of the wing and extending spanwise of the plane of said wing chord station, individual rigid backing plates bonded to each tension and compression patch to apply load uniformly over the area of each patch, tension-load-transmitting connections between the tension patch backing plates and the load dividing linkage associated with the upper beam member and separate compression load-transmitting connections between the backing members of the compression patches and the lower beam member.

21. The structure as claimed in claim 20, in which both the tension and compression load applying patches are arranged on the upper and lower surfaces of the wing in a plurality of rows extending spanwise and chorwise of the wing on either side of the said wing chord station point and each of the load-dividing linkages having means for apportioning the loads transmitted from the respective beam members to the respective spanwise rows of patches in a predetermined manner and said load-dividing linkages having further means for apportioning the load between the respective patches in each spanwise row of patches.

PAUL H. KEMMER.
EDGAR R. WEAVER.